United States Patent [19]

Chevrier

[11] Patent Number: 4,883,127
[45] Date of Patent: Nov. 28, 1989

[54] SPRAYER MARKER

[76] Inventor: Claude Chevrier, 948 Warner Street, Moose Jaw, Saskatchewan, Canada, S6H 5S4

[21] Appl. No.: 312,442

[22] Filed: Feb. 21, 1989

[30] Foreign Application Priority Data

Feb. 29, 1988 [CA] Canada ................................ 560143

[51] Int. Cl.$^4$ ............................................ A01B 69/02
[52] U.S. Cl. .................................. 172/126; 172/483; 172/500; 172/574; 172/501
[58] Field of Search ............... 172/126, 127, 128, 129, 172/130, 131, 132, 483, 491, 500, 501, 572, 574, 705, 573, 462, 497, 491

[56] References Cited

U.S. PATENT DOCUMENTS

| 558,335 | 4/1896 | Adkins | 172/126 |
| 1,103,101 | 7/1914 | Thompson | 172/705 |
| 1,389,491 | 8/1921 | Coons | 172/126 |
| 2,747,494 | 5/1956 | Rasmussen | 172/128 |
| 3,707,132 | 12/1972 | Hansen | 172/705 |
| 4,011,914 | 3/1977 | Elmer | 172/126 |
| 4,117,889 | 10/1978 | Larson | 172/126 |
| 4,280,563 | 7/1981 | Crow | 172/491 |
| 4,526,236 | 7/1985 | Jacobsen | 172/126 |
| 4,674,578 | 6/1987 | Bexten | 172/126 |

FOREIGN PATENT DOCUMENTS 464582  4/1950  Canada ................................ 172/126

Primary Examiner—Richard J. Johnson
Attorney, Agent, or Firm—Ade & Company

[57] ABSTRACT

A field marker for attachment to a sprayer boom has an outer square tube clamped to the end of the spray boom. An inner square tube slides in the outer tube and is connected to it by a pair of coil springs that bias the inner tube downwardly. An hydraulic cylinder joins the inner and outer tubes as well and, when actuated, raises the inner tube against the biasing force of the springs. A marking disk is mounted on the bottom end of the inner tube, preferably with an adjustable mounting to accommodate booms of different heights.

17 Claims, 2 Drawing Sheets

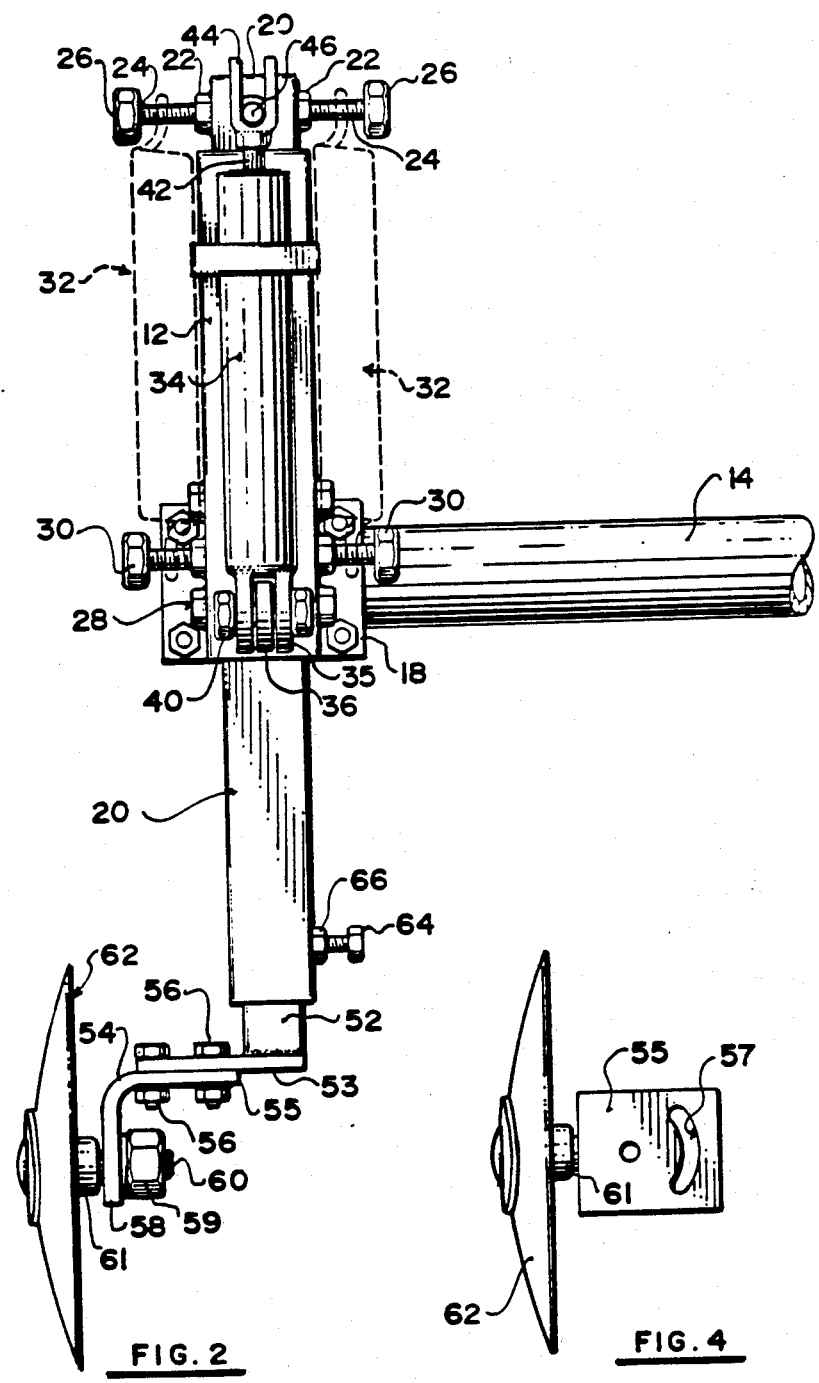

SPRAYER MARKER

FIELD OF THE INVENTION

The present invention relates to field markers, and more particularly to field markers for attachment to spray booms.

BACKGROUND

In the use of spray booms, it is of importance to be able to mark the field being traversed by the sprayer so that there are no gaps between the sprayer runs and no overspray, which is wasteful.

In the past, markers using dyes, foam or paper to mark a field have been proposed. Others provide for a mechanical action on the field to form a line which can be followed in a subsequent passage of the sprayer. These devices tend to be complex and difficult to install and handle.

The present invention aims at the provision of a novel mechanical field marker that is simple and easy to install and use.

SUMMARY

According to the one aspect of present invention there is provided a field marker for attachment to a spray boom, comprising:

a stationary member adapted to be clamped to the spray boom;

a moveable member mounted on the stationary member for free movement upward with respect thereto;

spring means connecting the stationary and moveable members and biasing the moveable member to a marking position extending downwardly from the stationary member;

power means for selectively moving the moveable member against the biasing force of the spring means; and a marker disk mounted on the moveable member.

According to another aspect of the present invention there is provided a field marker for attachment to a spray boom comprising:

an outer tube;

clamp secured to the outer tube for securing the outer tube to the spray boom in a generally upright orientation;

an inner tube slideable non-rotatably within the outer tube;

a pair of coil springs with upper ends secured to a top end of the inner tube above the outer tube, and lower ends secured to the outer tube adjacent a lower end thereof; and a field marker disk mounted on the inner tube.

In preferred embodiments of the invention, the stationary member is a square tube clamped vertically to the end of the spray boom, while the moveable member is a smaller square tube that slides in the stationary member. The springs are two coil springs on either side of the stationary tube, connected at their upper ends to the moveable tube and at their lower ends to the stationary tube. A single acting hydraulic cylinder is connected to the outer stationary tube near its bottom end and to the moveable tube near its top end. When actuated, this cylinder raises the inner tube within the outer tube, against the force of the springs. This allows the operator to lift the marker when taking a corner to eliminate strain on the sprayer boom. The hydraulic cylinder also allows the operator to put the marker in a transport position while in motion.

The marker is a compact device that does not extend pass the sprayer boom, thus eliminating the possibility of the marker hooking post, grades, etc. and causing consequent severe damage to the sprayer. The spring loading of the marker ensures that it will follow ground contours while making a clear, visible mark in either seeded or stubble fields. Preferably, the spring tension is adjustable to ensure adequate loading on the disk to provide the required mark.

BRIEF DESCRIPTION OF THE DRAWINGS

In the accompanying drawings, which illustrate exemplary embodiments of the present invention:

FIG. 2 is a front elevation of the marker of FIG. 1;

FIG. 4 is a detailed view of a disc mounting bracket.

DETAILED DESCRIPTION

Figures 1, 3:
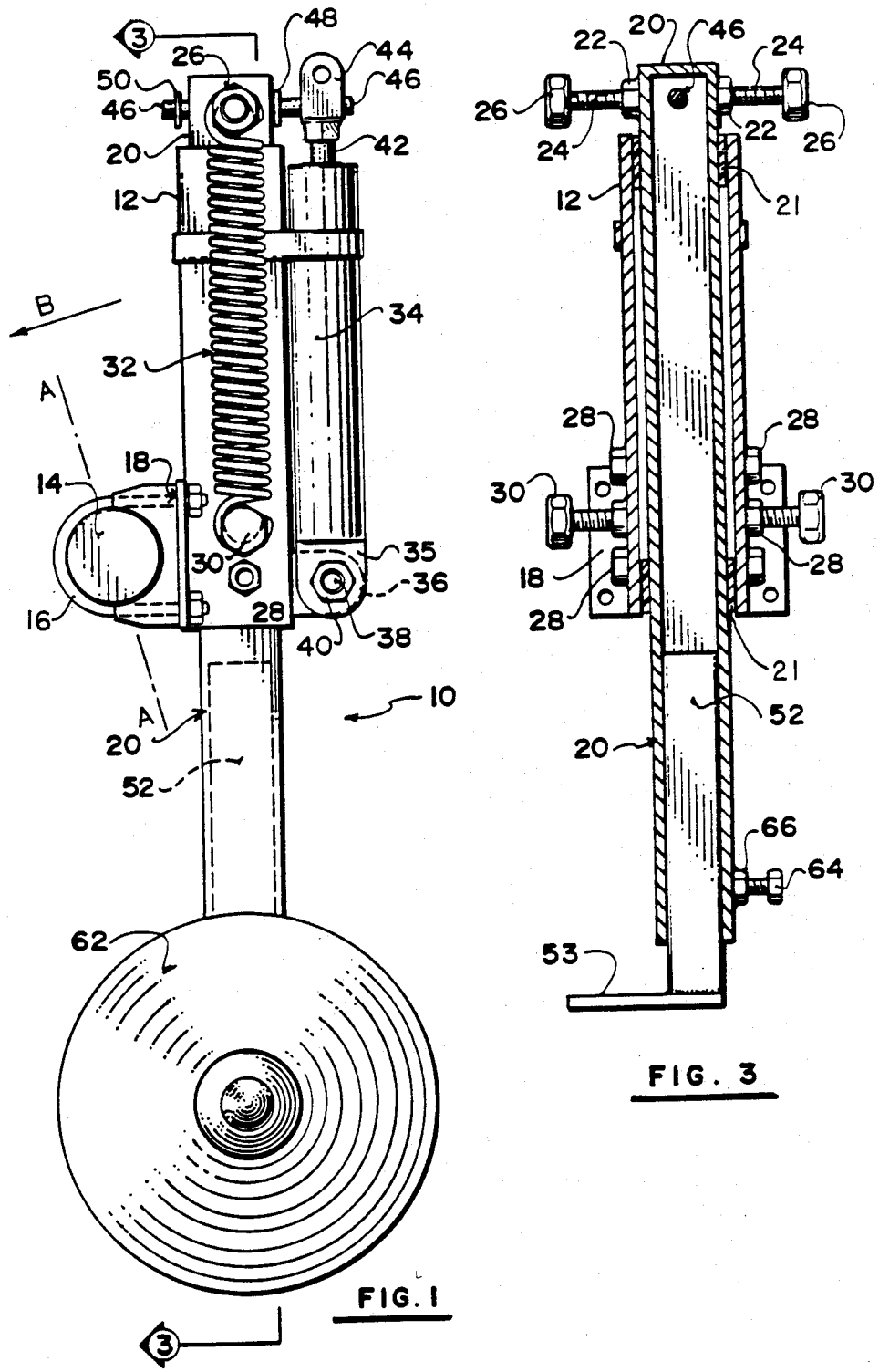
FIG. 1 is a side elevation of a marker according to the present invention.
FIG. 3 is a partial sectional view along line III—III of FIG. 1.

Referring to the accompanying drawings, there is illustrated a field marker 10 that consists of an outer stationary square tube 12 that is mounted on a spray boom 14 by a pair of U-bolt clamps 16 welded to a mounting plate 18 which is in turn welded to the tube 12. An inner moveable square tube 20 extends through the outer tube 12 and slides freely in two self-lubricated bushings 21. As illustrated most particularly in FIG. 2, two nuts 22 are welded to opposite sides of the inner tube 20, near its top end. Threaded rods 24 are seated in the nut 22 and carry lock nuts 26 on their outer ends. The outer tube 12 has three nuts 28 spaced along its opposite sides, near the bottom end. Two bolts 30 are threaded into aligned ones of the nuts 28 on opposite sides. The threaded rods 24 and the bolts 30 serve as spring retainers for two coil springs 32 located on opposite sides of the outer tube 12. By moving the bolts 30 between the nuts 28, the spring tension can be adjusted. The springs act to bias the moveable tube 20 downwards in the outer tube 12.

An hydraulic cylinder 34 has a pair of flanges 35 at its lower end secured to a lug 36 on the outer tube 12 by means of a bolt 38 and a nut 40. The cylinder rod 42 carries a shackle 44 that engages a rod 46 on the top end of the moveable tube 20. The shackle 44 is not connected to the rod 46, allowing independent upwards movement of tube 20. The rod 46 passes through the tube 20 and is held in place by a washer 48, welded to the rod, and a spring clip 50. The hydraulic cylinder is a single acting cylinder that, when actuated, drives the moveable tube 20 upwardly against the force of springs 32.

As illustrated most particularly in FIGS. 2 and 3, a mounting tube 52 projects into the open bottom end of the inner tube 20. It is secured to a plate 53 that projects to the side of the mounting tube. An angle bracket 54 has a horizontal flange 55 connected to plate 53 by two bolts 56. One of the bolts passes through two circular bores in the plate 53 and the flange 55, while the other passes through a bore in the plate 53 and an arcuate slot 57 in the flange 55. The bracket 54 also has a vertical flange 58 secured by means of a nut 59 to an axle 60. The axle carries a bearing 61 on which a marking disk 62 is secured. The mounting tube 52 is adjustably secured to the inner tube 20 by means of a set screw 64 threaded into a nut 66 welded onto the inner tube 20 adjacent its bottom end.

The preferred mounting of the marker is at an angle of approximately 20° to the vertical, with the disc leading. In FIG. 1, the line A—A illustrates the preferred orientation of vertical with respect to the marker, while arrow B indicates the direction of travel.

In use of the marker, the springs 32 force the inner tube 20 downwards forcing the disk into a working position in engagement with the ground, creating a visible mark for the sprayer operator. The hydraulic cylinder 34 is used to lift the disk 62 out of the working position. When the pressure in the cylinder is released, the springs force the rod downward, lowering the disk to the working position.

In the event that the disk 62 travels onto a rigid object or unlevel ground, the springs 32 allow the disk to "float" independently of the spray boom.

The cylinder 34 has a number of different uses. When making a tight turn, the cylinder allows the sprayer operator to raise the disk 62 out of the working position to avoid excessive wear, strain or damage on the spray boom. When using two markers, one at each end of the sprayer boom, only one marker is needed at a time and the cylinder 34 allows the operator to lift the disk 62 which is not needed. The cylinder also allows the operator to raise the marker to the transport position.

The adjustable securement of the mounting tube 52 in the inner tube 20 permits the use of a single, standard size disk marker with all different heights of field sprayer booms.

The adjustability of the angular orientation of the disk provided by the slot 57 in the flange 55 of its mounting bracket allows the disk to be adjusted to accommodate different soil conditions and hardness. It also facilitates the use of a single marker on either side of a sprayer.

An inexpensive version of the marker can be provided without the hydraulic cylinder.

In some embodiments of this invention, two coil springs located on opposite sides of hydraulic cylinder are connected to flanges 35 and shackle 44. These springs force hydraulic cylinder to close when hydraulic pressure is released.

While one embodiment embodiment of the present invention has been described in the foregoing, it is to be understood that other embodiments are possible within the scope of the present invention. For example, it is possible to mount the marker on a square boom rather than the circular section boom illustrated. This involves the use of square u-bolts and preferably with a 20° wedge mounted between the tube 12 and the plate 18. The invention is therefore to be considered limited solely by the scope of the appended claims.

I claim:

1. A field marker for attachment to a spray boom, comprising:
    a stationary member including elongate guide means and means for clamping the guide means to the spray boom with the guide means in a generally upright orientation;
    a moveable member mounted on the guide means for free up and down movement therealong;
    a spring means connecting the stationary and moveable members and biasing the moveable member to a marking position extending downwardly from the stationary member;
    power means for selectively moving the moveable member against the biasing force of the spring means; and
    a marker disk mounted on the moveable member.

2. A field marker according to claim 1 wherein the guide means member is a tube and the moveable member is slideable therein.

3. A field marker according to claim 2 wherein the guide means is a non-circular tube and the moveable member has a matching non-circular cross section.

4. A field marker according to claim 3 wherein the guide means, and, the moveable member are of square cross-section.

5. A field marker according to claim 2 including means for adjusting the biasing force of the spring means.

6. A field marker according to claim 2 wherein the spring means comprise at least one coil spring connected at a top end to the moveable member and at a bottom end to the stationary member.

7. A field marker according to claim 6 wherein the spring means comprise two coil springs located on opposite sides of the stationary member.

8. A field marker according to claim 7 including means for adjustably connecting the coil springs to the stationary member.

9. A field marker according to claim 1 wherein the power means comprise an hydraulic cylinder.

10. A field marker according to claim 9 wherein the hydraulic cylinder is a single-acting cylinder with a lower end connected to the stationary member and an upper end connected to the moveable member.

11. A field marker according to claim 1 including disk adjustment means adjustably mounting the disk on the moveable member.

12. A field marker according to claim 11 wherein the adjustment means include a tube slidably mounted in a bottom end of the moveable member.

13. A field marker according to claim 12 including a set screw for adjustably securing the tube of the adjustment means to the moveable member.

14. A field marker according to claim 11 wherein the adjustment means include means for adjusting the angular orientation of the disk.

15. A field marker for attachment to a spray boom comprising:
    an outer tube;
    clamp secured to the outer tube for securing the outer tube to the spray boom in a generally upright orientation;
    an inner tube slideable non-rotatably within the outer tube;
    a pair of coil springs with upper ends secured to a top end of the inner tube above the outer tube, and lower ends secured to the outer tube adjacent a lower end thereof; and
    a field marker disk mounted on the inner tube.

16. A field marker according to claim 15 wherein the outer and inner tubes are square.

17. A field marker according to claim 16 including a further square tube slideable within the inner tube, a set screw for securing the further square tube to the inner tube at a selected position, and means mounting the field marker disk on the further square tube.

* * * * *